Oct. 21, 1969  D. W. CHANEY  3,473,820
MULTIPLE AXLE SYSTEM FOR VEHICLES
Filed May 18, 1967  9 Sheets-Sheet 1
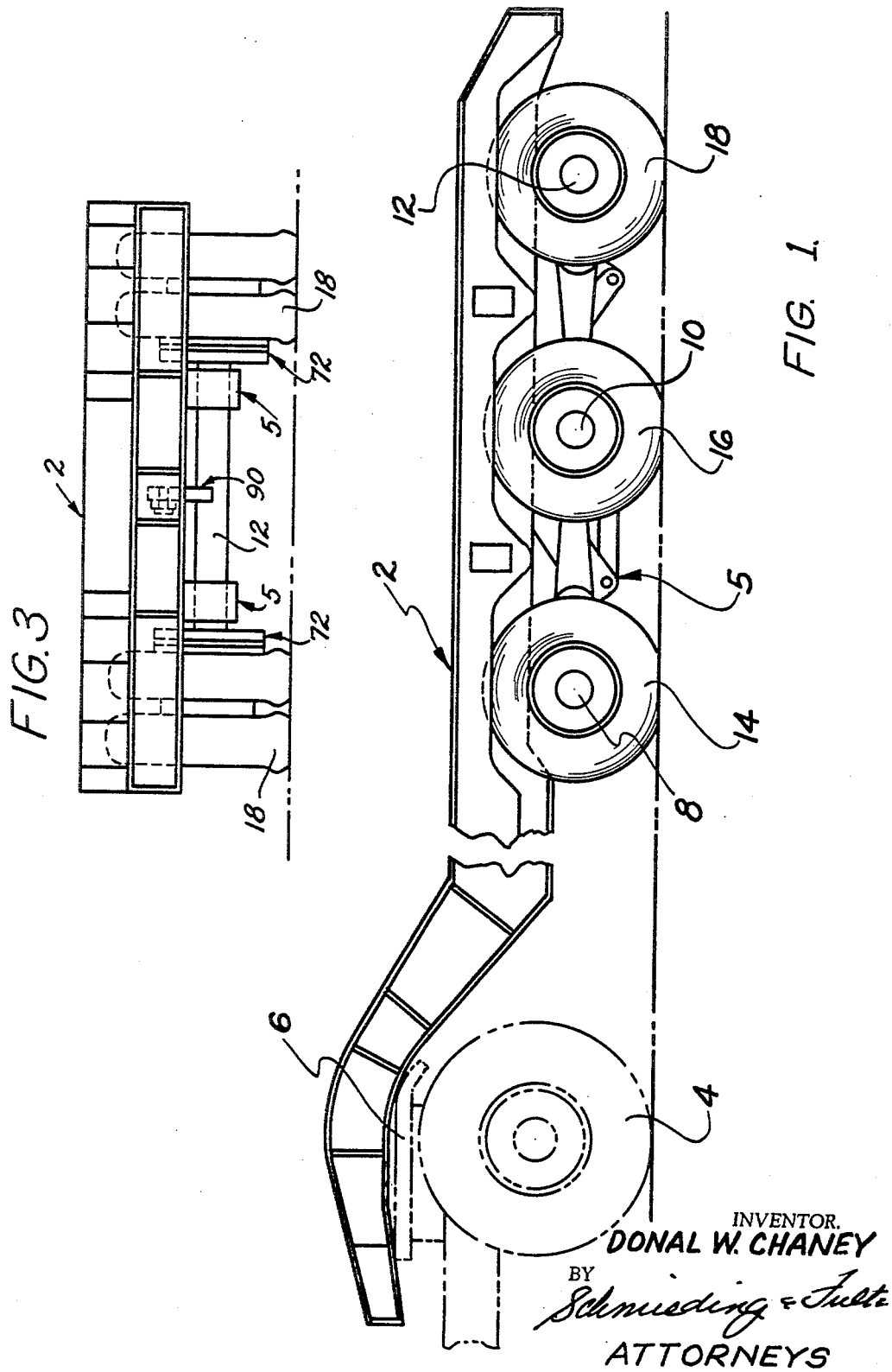
INVENTOR.
DONAL W. CHANEY
BY
Schmieding & Fulte
ATTORNEYS

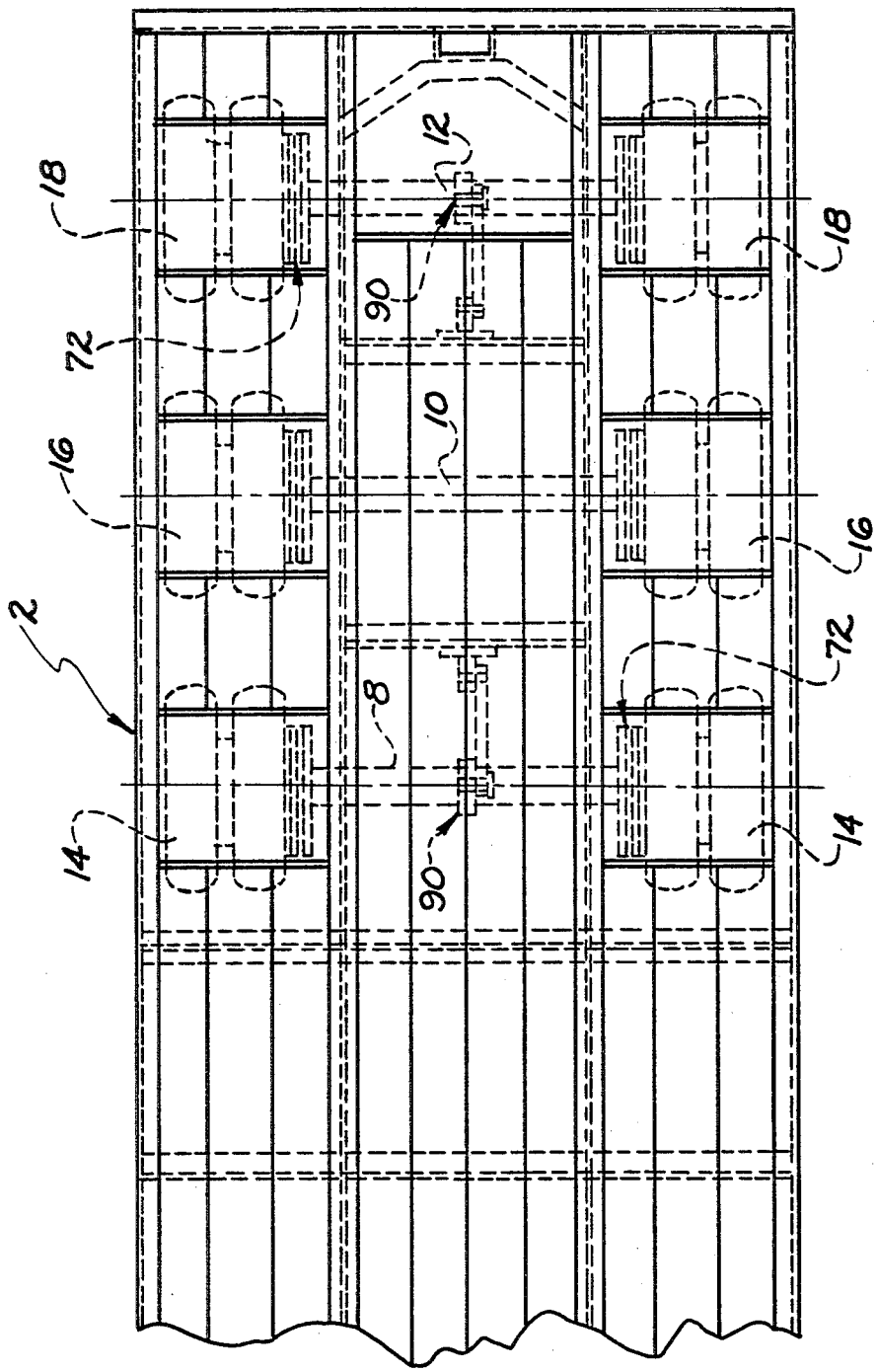

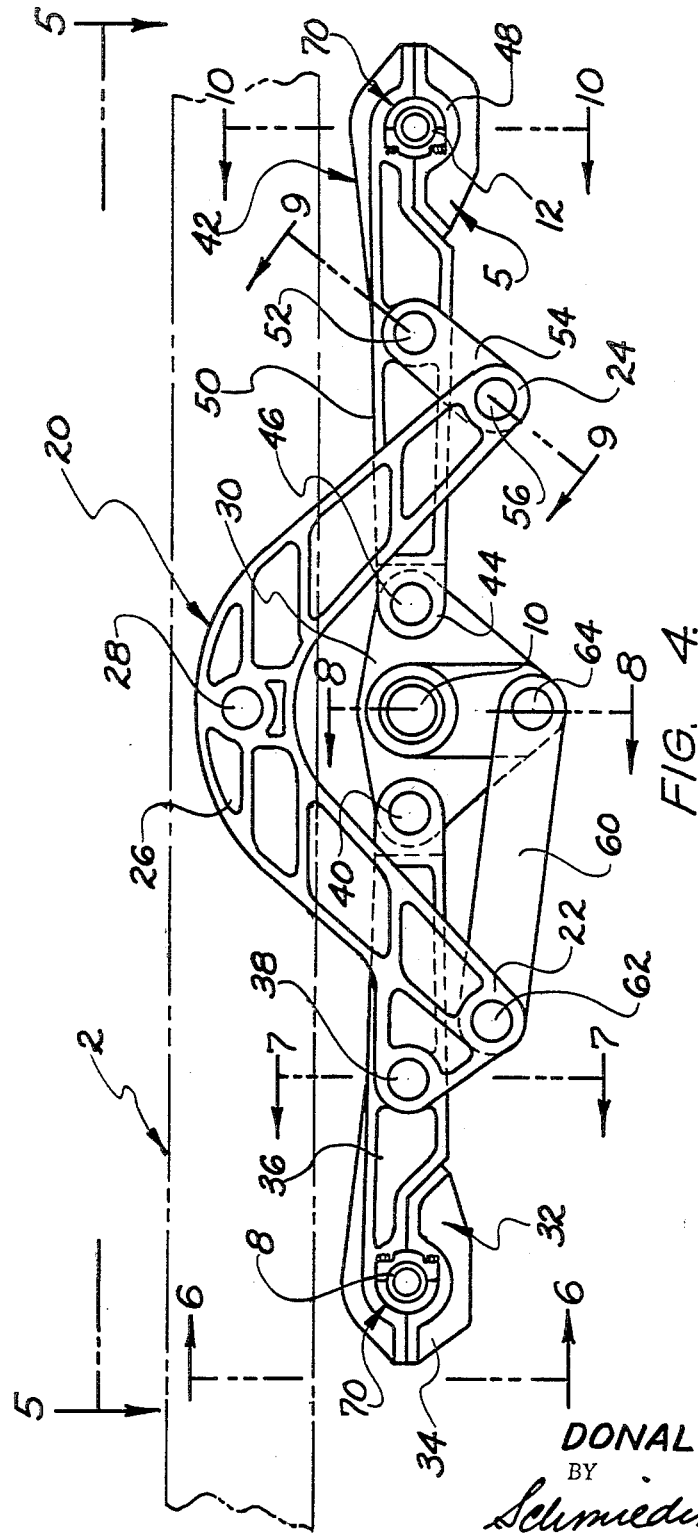

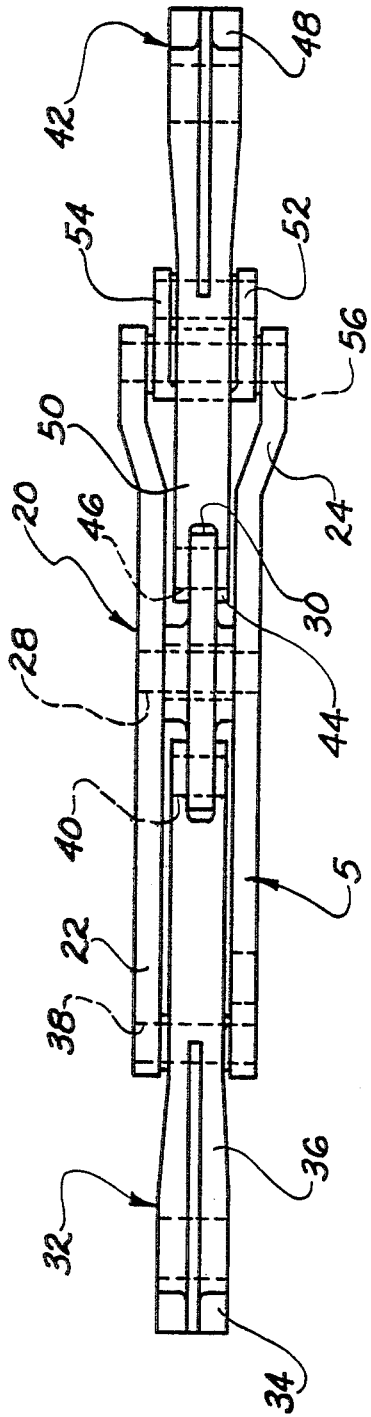
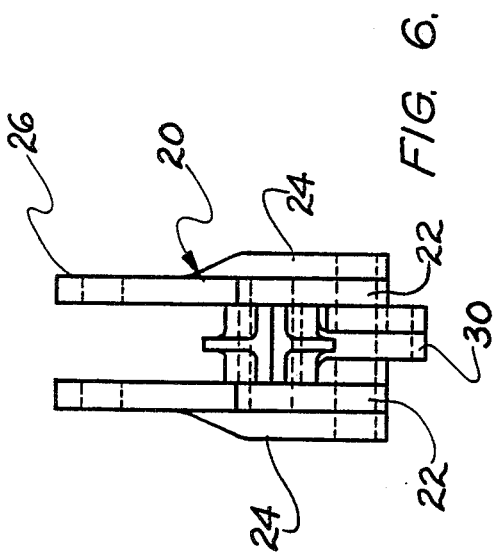
FIG. 5.
FIG. 6.
INVENTOR.
DONAL W. CHANEY
BY
Schmieding & Fults
ATTORNEYS INVENTOR.
DONAL W. CHANEY
BY
Schmieding & Fultz
ATTORNEYS

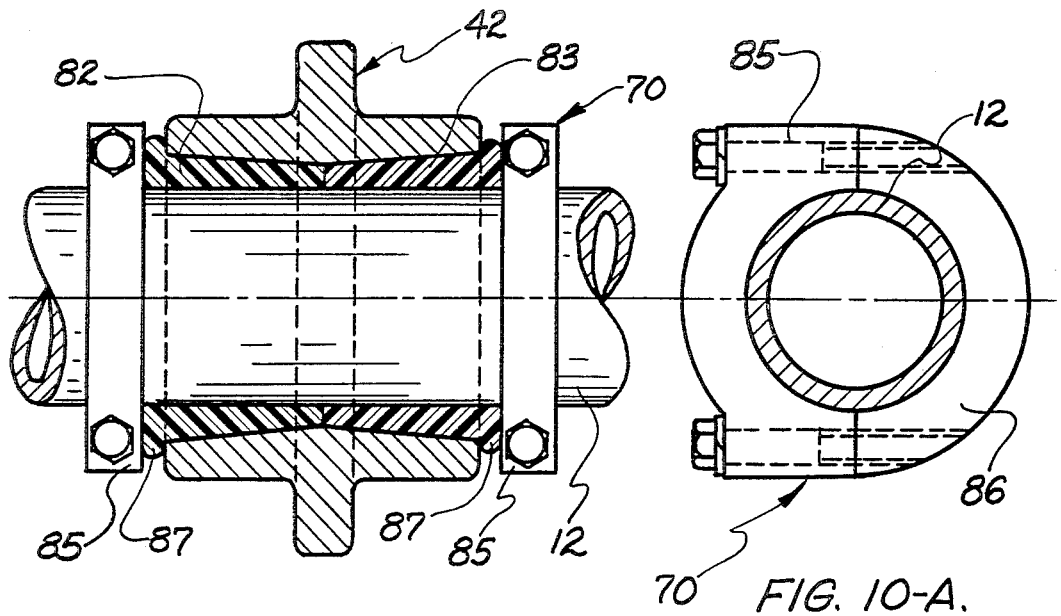
FIG. 10.  FIG. 10-A.
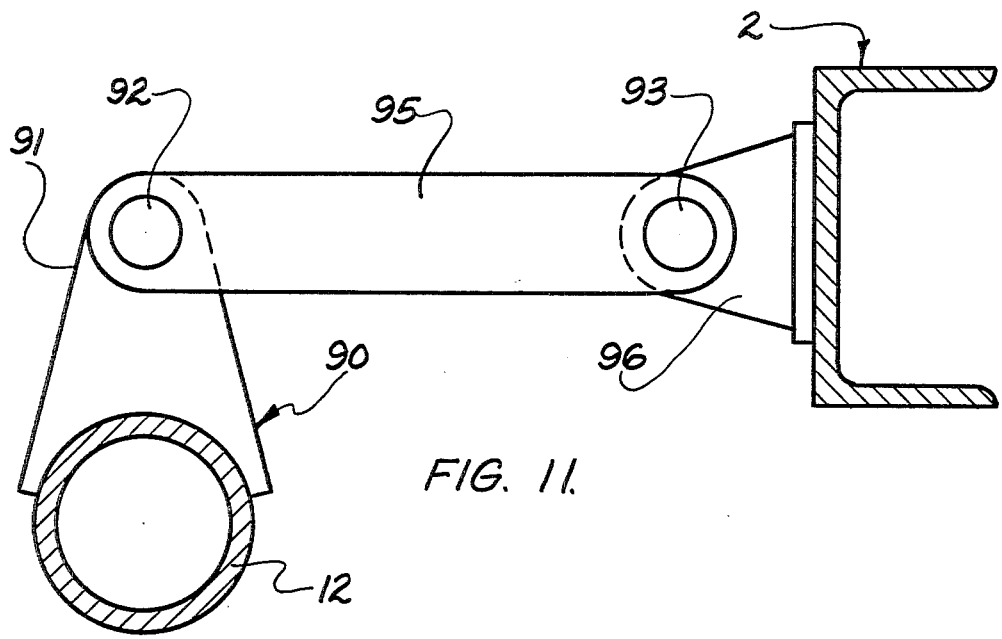
FIG. 11.

Oct. 21, 1969   D. W. CHANEY   3,473,820
MULTIPLE AXLE SYSTEM FOR VEHICLES

Filed May 18, 1967   9 Sheets-Sheet 8

INVENTOR.
DONAL W. CHANEY
BY
Schmieding & Fults
ATTORNEYS

United States Patent Office 3,473,820
Patented Oct. 21, 1969

3,473,820
MULTIPLE AXLE SYSTEM FOR VEHICLES
Donal W. Chaney, Galion, Ohio, assignor to Harsco
Corporation, Harrisburg, Pa., a corporation of
Delaware
Filed May 18, 1967, Ser. No. 639,416
Int. Cl. B62d; B60g 11/18; B60p
U.S. Cl. 280—104.5
12 Claims

ABSTRACT OF THE DISCLOSURE

A multiple axle suspension system for vehicles of the type wherein a plurality of load carrying axles are mounted below the trailer frame in tandem arrangement. The suspension system is characterized by load equalizing linkage components that substantially equally distribute the weight of the vehicle and load over all of the axles and wheels. In addition the axle mounting linkage is arranged such that the braking torque reactions on the various suspension components are balanced thereby eliminating undesirable "brake hop" characteristics present in prior systems.

---

This invention relates to multiple axle suspension systems for vehicles.

In general, the load carrying capability of large semitrailer type vehicles has been increased by utilizing a plurality of load carrying axles mounted in tandem arrangement. In accomplishing this axle mounting apparatus have been constructed such that the weight of the vehicle and load will be substantially equally distributed over all of the axles and wheels. Such load equalizing constructions, however, have generally presented a problem in that upon the application of braking action to the wheels certain unbalanced torque reactions are imposed on the axle mounting apparatus such that undersirable "brake hop" is caused to occur.

In accordance with the present invention, however, a novel axle mounting arrangement is provided whereby the braking torque reactions on the various linkage components are balanced thereby eliminating the above mentioned "brake hop" characteristics.

As another aspect of the present invention the suspension system incorporates a novel multiple walking beam apparatus wherein the pivotal connections of the walking beams are located such that the weight of the vehicle imposes horizontal components that urge the walking beams inwardly against their pivots thereby eliminating slack at said pivots.

As still another aspect of the present invention the suspension system incorporates a multiple walking beam apparatus wherein the pivotal conections for the walking beams and axles are substantially disposed in the same horizontal plane. This results in a low center of gravity and maximum ground clearance.

As another aspect of the present invention the suspension system incorporates novel axle mounting means for through type multiple axles which mounting means are adapted to yield to permit lateral inclination of the axles when the wheels encounter uneven road conditions. This permits all wheels to at all times maintain load supporting contact with the road.

It is therefore an object of the present invention to provide a novel multiple axle suspension system for vehicles wherein braking torque reactions are balanced thereby eliminating undesirable brake hop characteristics.

It is another object of the present invention to provide a novel multiple axle suspension system for vehicles that is uniquely arranged to prevent the occurance of slack at the various pivotal connections between the suspension compenents.

It is another object of the present invention to provide a novel multiple axle suspension system for vehicles that provides both a low center of gravity and maximum road clearance.

It is still another object of the present invention to provide a novel multiple axle suspension system for vehicles that includes through type axles that are adapted to incline laterally when uneven road conditions are encountered thereby permitting all wheels to maintain load supporting contact with the road.

Further objects and advantages of the present invention will be apparent from the following description, reference being had to the accompanying drawings wherein a perferred form of embodiment of the invention is clearly shown.

In the drawings:

FIG. 1 is a broken side elevational view of a trailer that includes a multiple axle suspension system constructed in accordance with the present invention;

FIG. 2 is a partial top elevational view of the trailer of FIG. 1;

FIG. 3 is a rear elevational view of the trailer of the preceding figures;

FIG. 4 is a side elevational view of a linkage comprising a portion of the suspension system of the trailer of the preceding figures;

FIG. 5 is a top elevational view of the linkage of FIG. 4;

FIG. 6 is a rear elevational view of the linkage of FIGS. 4 and 5;

FIG. 10 is a sectional view of a typical pivotal axle mount comprising a portion of the suspension linkage of FIG. 4, the section being taken along the line 10—10 of FIG. 4;

Figure 15:
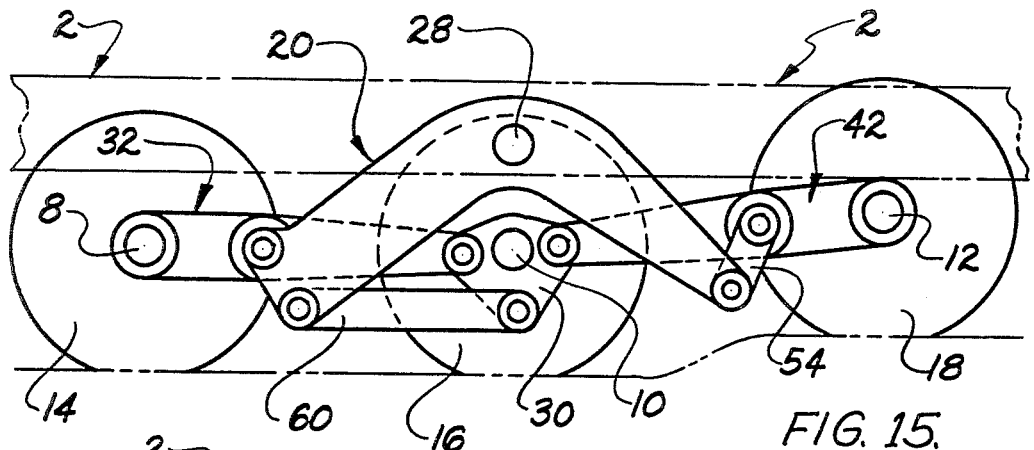
Figure 16:
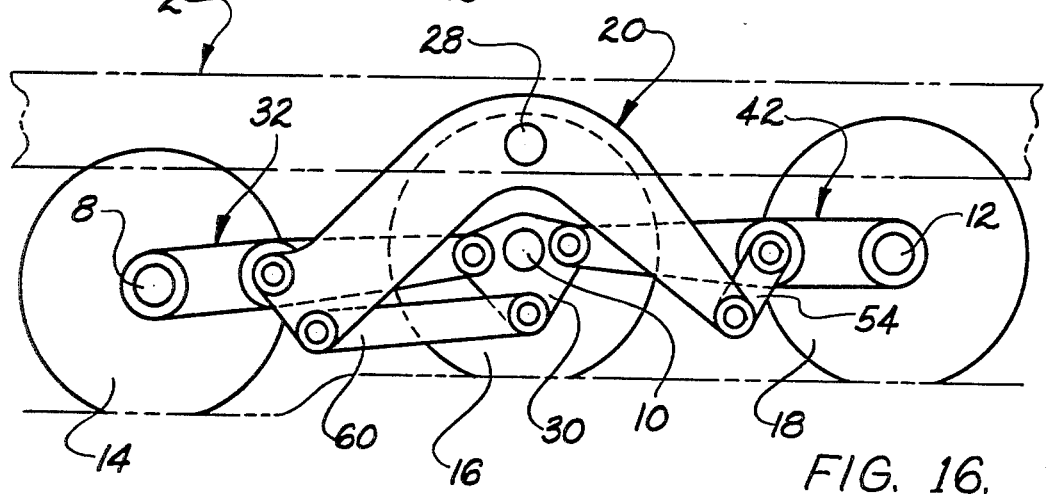
Figure 17:
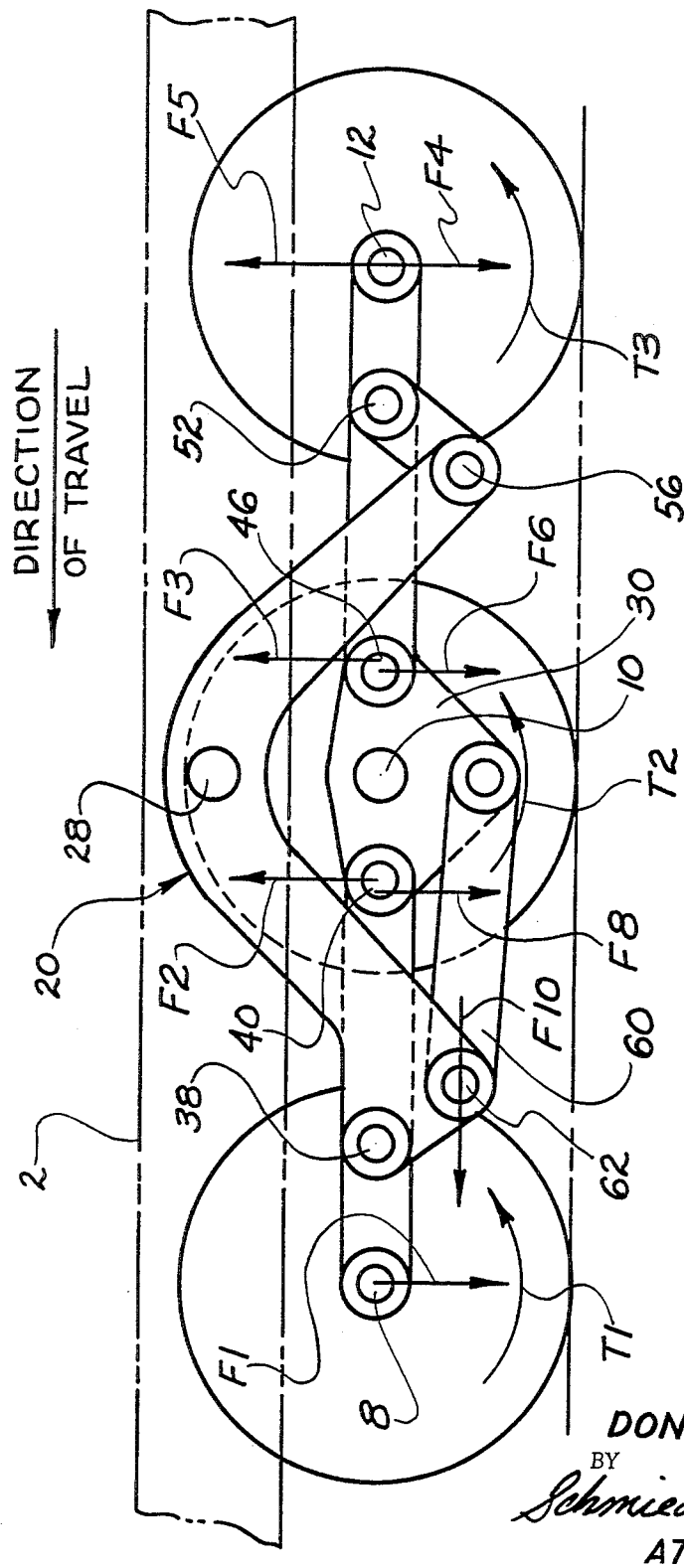

FIG. 10-A is a side elevational view, partially in section, of the axle mount of FIG. 10;

FIG. 11 is a side elevational view, partially in section, of a portion of a rotation prevention apparatus used in combination with the axle mount of FIGS. 10 and 10-A;

FIGS. 12 through 16 are diagrammatic views showing the suspension system in various configurations which occur responsive to the vehicle encountering various uneven road conditions; and FIG. 17 is a force diagram showing the brake torque reaction forces inposed on the suspension linkage of the present invention.

Referring in detail to the drawings, FIGS. 1 through 3 illustrate a trailer constructed in accordance with the present invention which includes a trailer frame indicated generally at 2. The front end of the trailer is connected to a towing vehicle 4 by means of a conventional fifth wheel 6.

The trailer frame is supported by right and left suspension linkage apparatus each of which is indicated generally at 5 in FIG. 3. One of the linkages 5 is illustrated in enlarged detail in FIGS. 4–6.

Each of the right and left suspension linkages 5 is supported by a respective end of a front axle 8, a center axle 10, and a rear axle 12. Front wheels 14 are mounted on front axle 8, center wheels 16 are mounted on center axle 10, and rear wheels 18 are mounted on rear axle 12. As seen in FIGS. 2 and 3, two wheels are preferably mounted on each end of each of the three axles.

Referring particularly to FIGS. 4-6 each of the suspension apparatus 5 comprises an equalizing beam indicated generally at 20 that includes a front end 22, a rear end 24, and an intermediate portion 26 pivotally connected to frame means 2 at a pivot pin 28.

Each suspension linkage further includes a center connector 30 and a front walking beam indicated generally at 32 that includes a front end 34, an intermediate portion 36 that includes a pivotal walking beam connection 38 with said front portion of equalizing beam 20. Front walking beam 32 further includes a rear end connected to said center connector means 30 at a pivotal connection 40.

With continued reference to FIGS. 4-6, the suspension linkage also includes a rear walking beam indicated generally at 42 that includes a front end 44, pivoted to center connector means 30 at a pivot 46. Rear walking beam 42 further includes a rear end 48 and an intermediate portion 50 that includes a pivotal connection 52 with one end of a shackle 54, the other end of said shackle being connected to said rear end 24 of said equalizing beam at a pivotal connection 56.

Referring again to FIGS. 4-6 a brake reaction torque arm 60 includes a front pivotal connection 62 with front end 22 of the equalizing beam 20 and a rear pivotal connection 64 with the previously mentioned center connector means 30.

As is best seen in FIGS. 10 and 11, each of the axles, for example, rear axle 12, extends through an axle mount indicated generally at 70 which permits yielding rocking movement of each of the through type axles when the wheels encounter uneven road conditions wherein the wheels on one end of an axle are raised or lowered vertically with respect to the wheels on the other end of the axle.

Referring particularly to FIGS. 10 and 10-A each of the axle mounts 70, for example the one shown for one end of axle 12, includes tapered resilient bushings 83, formed of synthetic rubber or the like, which include aligned bores that receive the axle. A split collar 85-86 is clamped on the axle on each side of the walking beam 42 and each tapered resilient bushing 83 includes an annular resilient flange 87 that is disposed between one of the split collars 85 and the confronting surface of walking beam 42. It will be understood that the resilient material of the bushings 83, annular flanges 87, and the clearance in which the flanges are disposed permit lateral inclination of axle 12 with respect to walking beam 42.

Referring next to FIGS. 2, 3, and 11, the axle mounting means further comprises a rotation resisting apparatus indicated generally at 90 that includes a bracket 91 having a lower end rigidly attached to axle 12 intermediate the right and left suspension linkages 5. A link 95 includes one end pivotally connected at 92 to the upper end of bracket 91 and the other end pivotally connected at 93 to a frame bracket 96 rigidly attached to trailer frame 2.

It will now be understood that the axle mount 42 and associated rotation resisting apparatus 90 cooperate in function to resist rotary and laterally imposed stresses between the axles and the trailer frame and at the same time cooperate in permitting lateral inclination of the axles when uneven road conditions are encountered.

As seen in FIGS. 2 and 3, each of the sets of wheels is provided with a braking mechanism indicated generally at 72. It will be understood that when these brake mechanisms are actuated the shoes and drums impose forces T1, T2 and T3, FIG. 17, on axles 8, 10 and 12. Brake mechanisms 72 are of a conventional type such as where pivoted brake shoes are moved radially against the peripheral surfaces of metal drums.

Figure 7:
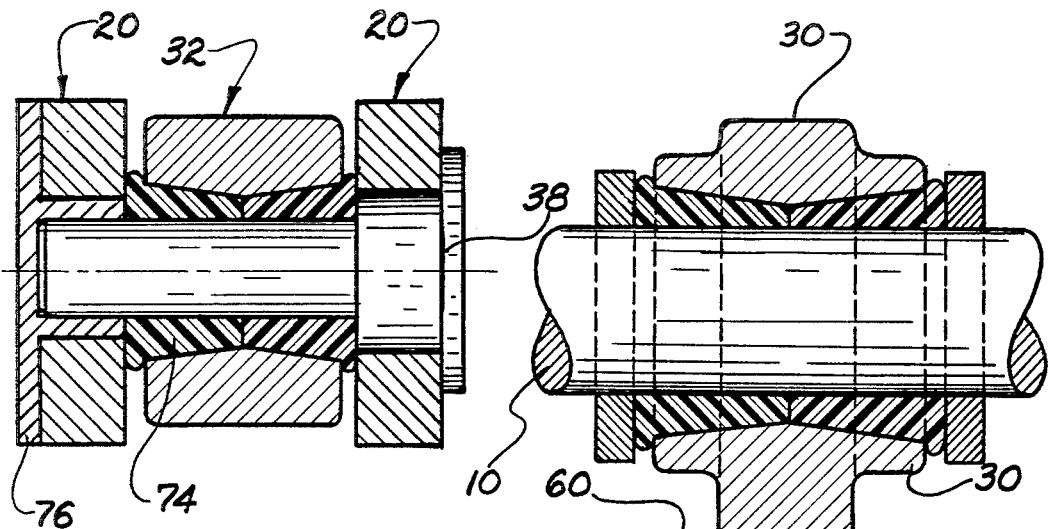
FIG. 7 is a sectional view of a pivotal walking beam connection comprising a portion of the linkage of FIG. 4, the section being taken along the line 7—7 of FIG. 4.

FIG. 7 is a sectional view showing details of the front walking beam pivots 38 of FIG. 4 which includes a pin 38, tapered resilient bushings 74, and a pin mount 76. Pin 38 and pin mount 76 are preferably joined together by a snug press fit.

Figure 8:
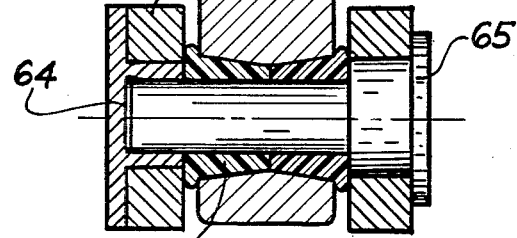
FIG. 8 is a sectional view of an axle mount and torque arm connection comprising a portion of the linkage of FIG. 4, the section being taken along the line 8—8 of FIG. 4.

FIG. 8 is a sectional view showing details of the center axle mounts and front torque arm pivots of FIG. 4. It will be noted that pin 65 extends through tapered resilient bushings 80 and a metal pin mount 64 receives the end of pin 65 in assembled press fit engagement.

FIG. 8 also shows a mounting hole in center connector 30 for receiving a center axle mount identical to the mount of FIGS. 10 and 10-A described previously herein.

Figure 9:
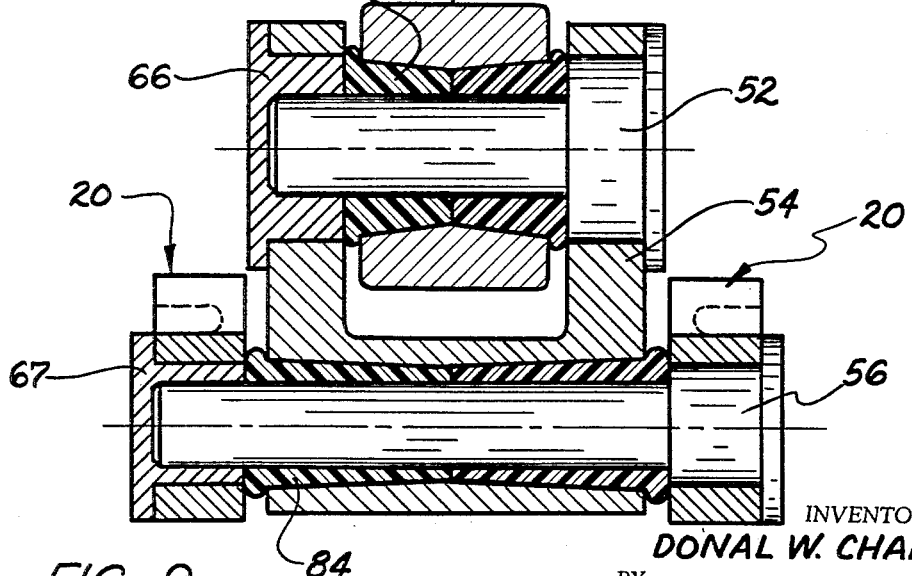
FIG. 9 is a sectional view showing a second pivotal walking beam connection comprising a portion of the linkage of FIG. 4, the section being taken along the line 9—9 of FIG. 4.

FIG. 9 is a sectional view that illustrates in detail the shackles 54 and pivots 52 and 56 of FIG. 4. Here again, tapered resilient bushings 82 and 84 are interposed between pins 52 and 56, the latter being retained by press fits with metal pin mounts 66 and 67.

Reference is next made to FIGS. 12 through 16 which illustrate one of the suspension linkages 5 in various typical positions of movement. In these views the linkage components assume various configurations imposed by variations in the road surface over which the vehicle is passing.

It should be pointed out that the right and left suspension linkages 5, FIG. 3, are independently constructed such that each linkage can assume any one of the various configurations independently of the other.

Figure 12:
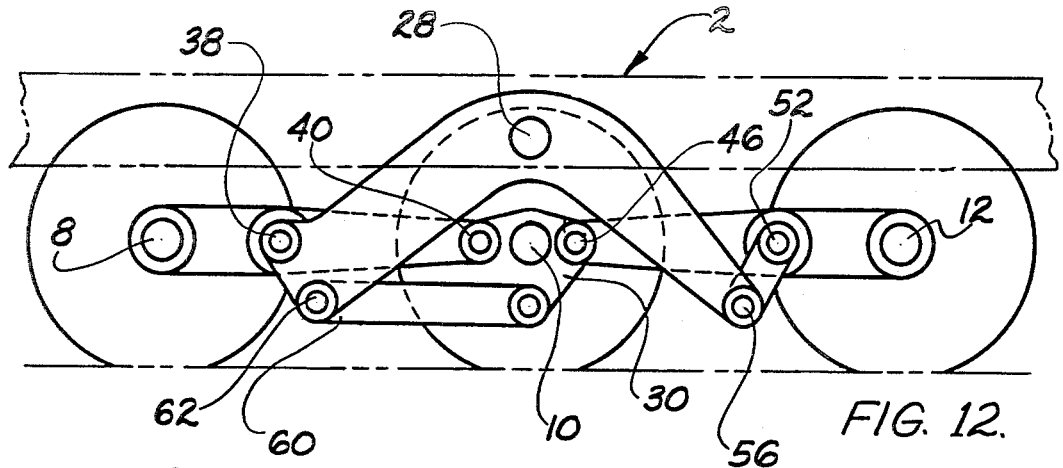

FIG. 12 illustrates the suspension linkage in a level road configuration.

Figure 13:
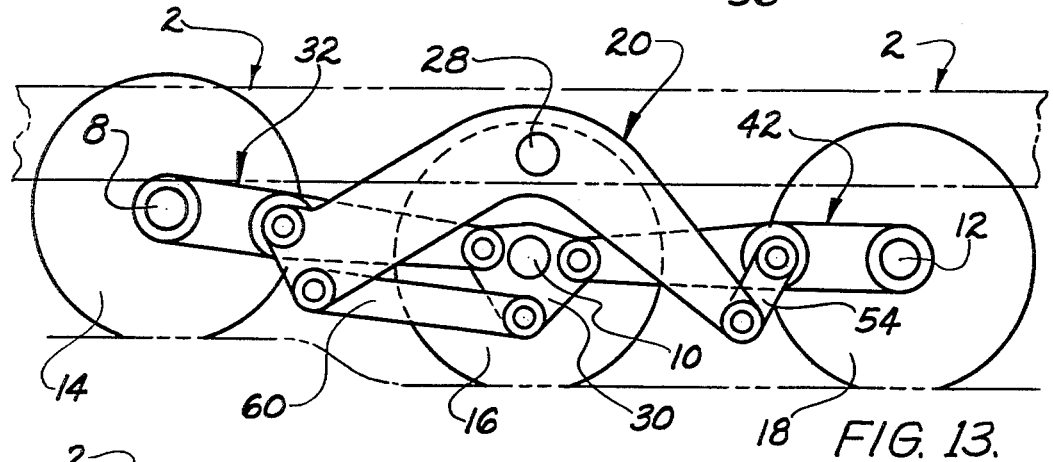

In FIG. 13 one of the front wheel 14 has encountered a protrusion in the road and equalizing beam 20, front walking beam 32, and torque arm 60 inclined upwardly about their respective pivot connections.

Figure 14:
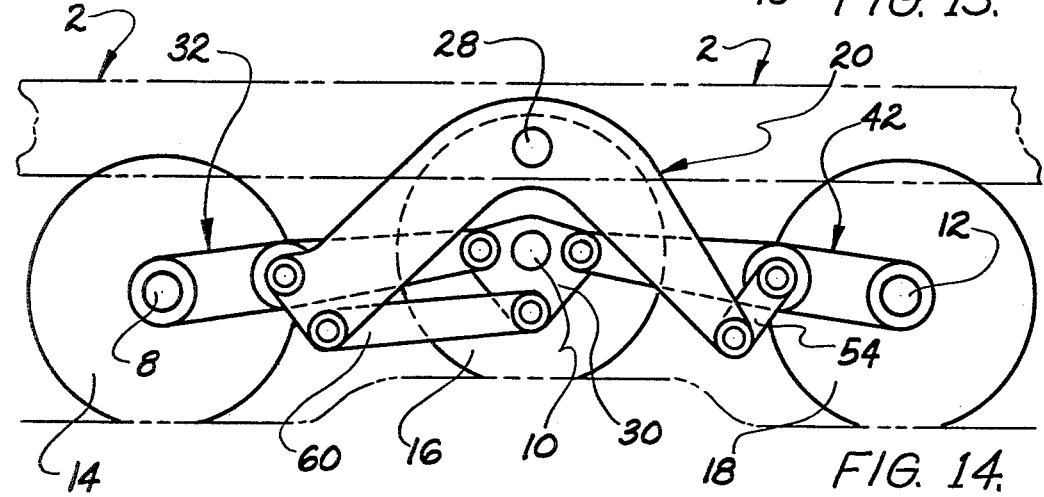

In FIG. 14, only one of the center wheels 16 is engaging a protrusion, and, in FIG. 15 only the rear wheel 18 is engaging a protrusion.

In FIG. 16 one of the front wheels 14 is shown encountering a depression in the road.

In each of the views discussed above it will be noted that equalizing beam 20, front walking beam 32, rear walking beam 42, and torque arm 60 are inclined or declined, with respect to their pivotal connections, as may be required to maintain road contact at all of the wheels.

It should be pointed out that trailer frame 2 is free to assume an inclined or declined position with respect to the right and left suspension linkages 5 when the towing vehicle first encounters a hill since the frame is free to pivot about right and left pivot pins 28.

It should further be pointed out that the axle mounts, details of which are shown in FIGS. 10 and 10-A, include the resilient bushings 38 that permit independent lateral inclination of each axle to maintain load supporting contact at both ends and equalize the loading over abrupt, choppy terrain.

Reference is next made to FIG. 17 which is a diagrammatic view illustrating the braking torque imposed forces on the suspension linkage of the present invention.

Considering the axles from front to rear, when the brakes are applied the effect of front axle torque T1 is down at front axle 8 as shown by arrow F1 and up at pivot 40 as shown by arrow F2.

The force F2 is transmitted to torque arm 60 about center axle 10 and the effect at said torque arm is shown by arrow F10. This force is returned to frame via pivot 62 and equalizer beam 20.

Reference is next made to center axle 10 where the brake torque is represented by arrow T2. Such torque T2 produces as force F3 at pivot 46 which is transmitted about the center of rear walking beam pivot 52 to the rear axle 12 where it creates a downwardly directed force F4. Such force F4 is counteracted by the upwardly directed force F5 created by the rear axle braking torque represented by arrow T3.

Torque T3 also produces a downwardly directed force F6 about pivot 52 which occurs at pivot 46. Such force F6 is counteracted by force F3.

It will now be understood that the front axle brake torque T1 is counteracted by torque arm 60. Moreover, center and rear axle brake torques T2 and T3 counteract each other. Hence, the sum of the moments about the suspension pivots is substantially zero whereby brake hop creating forces are eliminated.

While the form of embodiment of the present invention as herein disclosed constitutes a preferred form, it is to be understood that other forms might be adopted, all coming within the scope of the claims which follow.

I claim:

1. A multiple axle suspension system for vehicles comprising, in combination, frame means; wheel supporting means comprising an equalizing beam including a front end, a rear end, and an intermediate portion pivotally connected to said frame means; center connector means; a front walking beam including a front end, an intermediate portion including a pivotal walking beam connection with said front portion of said equalizing beam, and a rear end having a pivotal connection with said center connector means; a rear walking beam including a front end pivoted to said center connector means, an intermediate portion, and a rear end; means forming a second pivotal walking beam connection between said rear end of said equalizing beam and said intermediate portion of said rear walking beam; a front axle mounted on said front end of said front walking beam; a center axle mounted on said center connector means; a rear axle mounted on said rear end of said rear walking beam; wheels on said axles; brake means for said front axle, actuation of said brake means effecting a front axle torque that produces a reaction force F2 at said pivotal connection of said rear end of said front walking beam and said center connector means that tends to rotate said center connector means about said center axle; and a torque resisting means operatively connected to the wheel supporting means and connected to said center connector means eccentric of said center axle so as to oppose said reaction force F2 and thereby prevent brake imposed rotation effects on said system.

2. The apparatus defined in claim 1 wherein said torque resisting means comprises a torque arm operative between said equalizing beam and a pivotal torque arm connection one said center connector means eccentric of said center axle.

3. A multiple axle suspension system for vehicles comprising, in combination, frame means; an equalizing beam including a front end, a rear end, and an intermediate portion pivotally connected to said frame means; center connector means; a front walking beam including a front end, an intermediate portion including a pivotal walking beam connection with said front portion of said equalizing beam, and a rear end pivoted to said center connector means; a rear walking beam including a front end pivoted to said center connector means, an intermediate portion, and a rear end; means forming a second pivotal walking beam connection between said rear end of said equalizing beam and said intermediate portion of said rear walking beam; a front axle mounted on said front end of said front walking beam; a center axle mounted on said center connector means; a rear axle mounted on said rear end of said rear walking beam; wheels on said axles; and a brake reaction torque arm including a first pivotal torque arm connection with said equalizing beam and a second pivotal torque arm connection with said center connector means eccentric of said center axle.

4. The apparatus defined in claim 3 wherein said first pivotal torque arm connection with said equalizing beam is eccentric of said first pivotal walking beam connection.

5. A suspension system for vehicles comprising, in combination, frame means; a plurality of front, center, and rear through type axles disposed in tandem arrangement; a right suspension linkage connecting the right ends of said axles to one side of said frame means; and a left suspension linkage connecting the left ends of said axles to the left side of said frame means, each of said right and left suspension linkages including an equalizing beam pivoted to the frame, a forwardly extending walking beam pivoted to said equalizing beam, a rearwardly extending walking beam pivoted to said equalizing beam, a center connector means on said center axle for confronting ends of said two walking beams, and a brake reaction torque arm connected between said equalizing beam and a pivotal torque arm connection on said center connector means eccentric of said center axle.

6. The suspension system defined in claim 5 wherein the longitudinal axis of said torque arm extends substantially parallel with but spaced from the longitudinal axis of one of said walking beams.

7. The apparatus defined in claim 5 that includes a plurality of axle mounted means, one at each end of each of said axles, each of said mounting means including a resilient bushing interposed between an axle end and its respective suspension linkage.

8. The apparatus defined in claim 5 that includes a plurality of axle mounting means, one at each end of each of said axles, each of said mounting means including a resilient bushing interposed between an axle end and its respective suspension linkage; and rotation resisting means connected between certain of said axles and said frame.

9. The apparatus defined in claim 5 that includes a plurality of axle mounting means, one at each end of each of said axles, each of said mounting means including a resilient bushing interposed between an axle end and its respective suspension linkage; and means forming a shoulder mounted on said axle on one side of said axle mounting means, in spaced relationship therewith, said resilient bushing including an annular protrusion disposed between said shoulder ad a confronting surface of one of said linkages.

10. A multiple axle suspension system for vehicles comprising, in combination, frame means; right and left suspension linkage apparatus each of which includes an equalizing beam including a front end, a rear end, and an intermediate portion pivotally connected to said frame means, center connector means, a front walking beam including a front end, an intermediate portion including a pivotal walking beam connection with said front portion of said equalizing beam, and a rear end pivoted to said center connector means, a walking beam including a front end pivoted to said center connector means, an intermediate portion, and a rear end, means forming a second pivotal walking beam connection between said rear end of said equalizing beam and said intermediate portion of said rear walking beam, a front through type axle mounted on said front end of said front walking beam, a center through type axle mounted on said center connector means, a rear through type axle mounted on said rear end of said rear walking beam, wheels on said axles, and a brake reaction torque arm operative between said equalizing beam and said center connector means and including a pivotal torque arm connection with said center connector means eccentric of said center axle; and a plurality of axle mounting means, one at each end of each of said axles, each of said mounting means including a resilient bushing interposed between an axle end and its respective suspension linkage.

11. A multiple axle suspension system for vehicles comprising, in combination, frame means; right and left suspension linkage apparatus each of which includes an equalizing beam including a front end, a rear end, and an intermediate portion pivotally connected to said frame means, center connector means, a front walking beam including a front end, an intermediate portion including a pivotal walking beam connection with said front portion of said equalizing beam, and a rear end pivoted to said center connector means, a walking beam including a front end pivoted to said center connector means, an intermediate portion, and a rear end, means forming a second pivotal walking beam connection between said rear end of said equalizing beam and said intermediate portion of said rear walking beam, a front through type axle mounted on said front end of said front walking beam, a center through type axle mounted on said center connector means, a rear through type axle mounted on said rear end of said rear walking beam, wheels on said axles, and a brake reaction torque arm operative between said equalizing beam and said center connector means and including a pivotal torque arm connection with said center connector means eccentric of said center axle; a plurality of axle mounting means, one at each end of each of said axles, each of said mounting means including a resilient bushing interposed between an axle end and its respective suspension linkage; and rotation resisting means connected between certain of said axles and said frame.

12. The suspension system defined in claim 11 wherein said rotation resisting means includes a radially extending arm attached to certain of said axles and a link including one end connected to said arm and the other end connected to said frame.

References Cited

UNITED STATES PATENTS

| | | | |
|---|---|---|---|
| 2,954,239 | 9/1960 | Kollander | 280—104.5 |
| 3,129,953 | 4/1964 | Hickman | 280—104.5 |
| 3,069,184 | 12/1962 | Hickman | 280—104.5 |

PHILIP GOODMAN, Primary Examiner

U.S. Cl. X.R.

267—57.1